United States Patent [19]

McCorsley, III et al.

[11] 4,211,574

[45] Jul. 8, 1980

[54] PROCESS FOR MAKING A SOLID IMPREGNATED PRECURSOR OF A SOLUTION OF CELLULOSE

[75] Inventors: Clarence C. McCorsley, III; Julianna K. Varga, both of Asheville, N.C.

[73] Assignee: Akzona Incorporated, Asheville, N.C.

[21] Appl. No.: 819,080

[22] Filed: Jul. 26, 1977

[51] Int. Cl.² .................................................. C08L 1/02
[52] U.S. Cl. .................................. 106/163 R; 106/186
[58] Field of Search ............... 106/186, 198, 125, 163; 8/189

[56] References Cited

U.S. PATENT DOCUMENTS

| | | | |
|---|---|---|---|
| 2,179,181 | 11/1939 | Graenacher | 8/35 |
| 3,503,700 | 3/1970 | Griggs | 8/189 |
| 3,508,941 | 4/1970 | Johnson | 106/126 |
| 3,647,493 | 3/1972 | Gresch et al. | 106/198 |

*Primary Examiner*—Theodore Morris
*Attorney, Agent, or Firm*—Francis W. Young; Jack H. Hall; Clelle W. Upchurch

[57] ABSTRACT

A process is provided for making a solid precursor of a solution of cellulose in a tertiary amine oxide by suspending cellulose in a mixture containing a tertiary amine oxide and water under conditions where the amine oxide will not dissolve the cellulose until sufficient amine oxide has been absorbed to dissolve the cellulose when it is heated. An organic liquid which is not chemically reactive with the amine oxide or cellulose but is miscible with the tertiary amine oxide and is a non-solvent for the cellulose may be included in the amine oxide-water mixture to assist in the removal of excess water from the precursor or promote better distribution of the tertiary amine oxide through the cellulose.

19 Claims, No Drawings

PROCESS FOR MAKING A SOLID IMPREGNATED PRECURSOR OF A SOLUTION OF CELLULOSE

This invention relates generally to regenerated cellulose and more particularly to a process for preparing a solid cellulosicamine oxide material which can be used for making cellulosic fibers and filaments.

A process for dissolving cellulose in a tertiary amine oxide is disclosed in U.S. Pat. No. 2,179,181. In accordance with the disclosed process from 7 to 10% by weight of cellulose is dissolved in 93 to 90% by weight of a tertiary amine oxide to form a viscous liquid from which the cellulose may be precipitated by pouring the liquid in water, alcohol or dilute acid. The tertiary amine oxides suitable for practicing the disclosed process contain fourteen or less carbon atoms and may be an oxide of a trialkyl amine or of an alkylcycloaliphatic tertiary amine. The resulting solution has the disadvantage of having a low solids content and a high viscosity.

Another process for dissolving cellulose in a tertiary amine oxide is disclosed in U.S. Pat. No. 3,447,939. A cyclic mono (N-methylamine-N-oxide) such as N-methylmorpholine-N-oxide is used as the solvent. The resulting solutions have much the same disadvantages of those prepared by the process disclosed in U.S. Pat. No. 2,179,181 because they are also of low solids content and have a high viscosity.

In accordance with the process disclosed in U.S. Pat. No. 3,508,941, two or more different polymers are dissolved in a cyclic mono (N-methylamine-N-oxide) compound and are precipitated together to produce a random copolymer. A diluent such as dimethyl sulfoxide, N-methyl-pyrrolidone or sulfolane may be added to the solution to reduce its viscosity. As indicated by the examples set forth in the patent, only low solids solutions can be prepared when cellulose is one of the compounds used in the preparation of the solution.

It is an object of this invention to provide a process for making a solid product which is adapted to be heated to prepare a solution of cellulose in a tertiary amine oxide. Another object of the invention is to provide a chip or similar granular cellulosic product which can be heated alone to form a solution of cellulose in an amine oxide which is suitable for shaping and coagulating the cellulose. Another object of the invention is to provide a process for making a mixture of cellulose and amine oxide which can be comminuted, stored and otherwise treated as a solid material and can be heated later to convert the mixture into a solution of cellulose in a tertiary amine oxide which is adapted for extrusion or spinning. A more specific object of the invention is to provide a cellulosic product which can be converted into a solution of cellulose in a tertiary amine oxide which has a higher solids content than the amine oxide solutions of the above discussed prior art. A still more specific object of the invention is to provide a precursor of a solution of cellulose in amine oxide which is a solid at ambient temperatures but becomes a solution adapted to be extruded or spun when heated to a temperature above ambient.

The foregoing objects and others are accomplished in accordance with this invention, generally speaking, by providing a process wherein cellulose is mixed with a liquid amine oxide in such proportions and under conditions of temperature and pressure where no substantial dissolution of the cellulose in the amine oxide will occur, and the resulting mixture is steeped at such a temperature until the cellulose absorbs amine oxide and water without significant dissolution, and the excess water, if any, is stripped from the saturated cellulose at a temperature which is also below one at which significant dissolution of the cellulose in the amine oxide occurs.

In one embodiment of the invention, cellulose is mixed with a liquid solution of a tertiary amine oxide-water and liquid organic non-solvent for cellulose in such proportions and at a temperature below that where there will be any substantial dissolution of the cellulose in the solution, and the resulting suspension is steeped at such a temperature until the cellulose absorbs tertiary amine oxide-water-non-solvent solution without significant dissolution, and the non-solvent is removed from the mixture at a temperature which is also below one at which significant dissolution of the cellulose in the amine oxide occurs. Some of the water may be removed with the non-solvent. In the embodiment where excess water instead of an organic non-solvent is used to decrease the solubility of the cellulose in the amine oxide, the excess water is stripped from the cellulose after sufficient amine oxide has been absorbed by the cellulose for subsequent complete dissolution. The resulting solid product may be comminuted such as by grinding or chopping to form fragments or chips which are suitable for extrusion, spinning, molding or the like. They may be stored for later conversion into a solution or they may be heated immediately to form a solution and shaped.

The invention thus contemplates a process for making a solid precursor of a solution of cellulose in a tertiary amine oxide which involves suspending cellulose in a mixture which is a non-solvent for the cellulose at the temperature of the suspension and contains a tertiary amine oxide and water with or without an organic liquid which is miscible with the tertiary amine oxide and is a non-solvent for cellulose until sufficient amine oxide is absorbed by the cellulose for complete dissolution of the cellulose later on when it is heated. Preferably, the cellulose is steeped in the amine oxide-water mixture or amine oxide-water-organic non-solvent mixture for about 0.5 to about 30 minutes at a temperature of about 85° C. to 110° C., until sufficient amine oxide has been absorbed to provide from about 10–40% by weight cellulose and 75–85% amine oxide-water mixture in the precursor after excess water or excess water and organic non-solvent have been removed. The amine oxide-water absorbed by the cellulose will contain from about 99 to about 70% by weight amine oxide with the remainder being water.

The product of the invention may be used for making a shaped cellulose product by heating the cellulose containing tertiary amine oxide and water to a temperature where the cellulose dissolves and removing the tertiary amine oxide while shaping the solution.

The solid product produced by the process of the invention is cellulose containing amine oxide and some water which, when heated, will dissolve the cellulose. It has been found that by suspending sheet or particulate cellulose in amine oxide and water, sufficient amine oxide will be absorbed by the cellulose to dissolve the cellulose upon heating to form a high solids solution having a viscosity suitable for spinning. By controlling the temperature and the proportions of the amine oxide-water or amine oxide-organic non-solvent in the solution mixed with the cellulose, dissolution of the cellulose in the solution can be postponed until it is to be extruded or spun. Hence, the invention provides a method for making a raw material which is complete in itself for the extrusion of cellulose film and spinning of cellulose fibers and yarns.

The water and organic non-solvent mixed with the amine oxide promotes swelling of the cellulose fibers thus facilitating absorption of the amine oxide. This makes it possible to produce a precursor which when heated is converted to a solution of higher solids then the solutions disclosed in the above discussed prior art. While water alone will cause swelling of the fibers, the organic non-solvent assists in swelling the fibers and has the advantage of providing a vehicle which assists in the removal of excess water after the amine oxide has been absorbed.

Preferably, the mixture of amine oxide and water or amine oxide-water-organic non-solvent is heated to a temperature of about 50° to about 140° C. before it is mixed with the cellulose to promote uniform absorption of the liquid mixture by the cellulose. The cellulose begins to swell shortly after it is contacted by the amine oxide-non-solvent-water mixture. The temperature of the slurry during the steeping or swelling step has a significant effect on the extent to which the cellulose fibers will become swollen. The optimum temperature to be used is the one which will promote rapid and maximum swelling and a temperature at which the tertiary amine oxide is liquid. The temperature must also be below the boiling point of the organic non-solvent, if any, in the mixture and below the decomposition temperature of the tertiary amine oxide.

The organic non-solvent may be removed at any temperature at which the cellulose does not dissolve. However, a temperature must be maintained which permits efficient and rapid removal of the solvent under vacuum. With most non-solvents the temperature may be from about 40° C. to about 90° C. during non-solvent removal. The non-solvent is removed under vacuum at a pressure of as low as 0.01 mm of mercury.

As pointed out above, the product obtained by removal of the water and/or organic non-solvent can be transferred immediately to suitable equipment for shaping it into a regenerated cellulose product if it is dry solid or it can be dried, cooled and stored until some later date. If the product is soft and/or wet with amine oxide, it may be dried at any suitable temperature at which the cellulose will not dissolve.

The relative proportions of cellulose, water, amine oxide and liquid organic non-solvent for cellulose which are mixed together may be varied broadly depending upon the composition desired for the product and as long as sufficient amine oxide-water mixture will remain to dissolve the cellulose after the non-solvent has been removed. Preferably, the ratio of liquid phase to cellulose in the slurry should be such that the cellulose becomes saturated but the excess of liquid phase is not so great that unnecessary separation of large volumes of liquid is required.

The water content of the liquid mixture of amine oxide-water or amine oxide-water-organic non-solvent mixed with the cellulose should be as low as possible to avoid removing large volumes of water at the end of the process. However, in the embodiment using an organic non-solvent, the ratio of organic non-solvent and water to cellulose must be such that the cellulose is swollen to promote absorption of amine oxide by the cellulose. When the percentage by weight cellulose in the product is to be low (say about 10%) the ratio of non-solvent plus water to the cellulose at the beginning of the process should be about 2.5 parts or more by weight non-solvent plus water per part of cellulose. When the product (cellulose containing amine oxide) is to contain a high percentage of say about 40% by weight cellulose the ratio at the beginning of the process should be more than about 0.25 part by weight non-solvent-water mixture per part of cellulose and less than about 2 parts by weight non-solvent-water mixture per part of cellulose. Since it is preferred that the product contain from 10 to 40% by weight cellulose, a ratio of from 0.25 to 2.5 or more parts by weight non-solvent-water mixture to cellulose is preferred.

The swelling of the cellulose appears to be independent of the ratio of non-solvent to water. However, the ratio must be such that the desired amine oxide-water ratio remains in the cellulose after the non-solvent is removed. For best results, the amine oxide should contain from about 10% to about 40% by weight water and the amount of non-solvent in the slurry should be from about 15% by weight to about 80% based on the weight of amine-oxide water in the slurry.

Best results are obtained if the dried product after excess water and/or organic non-solvent have been removed contains from about 10% to about 40% by weight cellulose, 0 to 20% by weight water and about 90% to 50% by weight amine oxide.

The solid product after the organic non-solvent has been removed and the water content has been reduced to from 0 to about 20% by weight water based on the weight of the product may be heated to a temperature of say 120° C. or higher where the cellulose is dissolved by the amine oxide-water mixture without the addition of amine oxide, water or other material and the resulting solution may be spun or otherwise shaped into a useful cellulosic product.

Any suitable cellulose may be used in the process such as, for example, starch, cotton linters or various kinds of wood cellulose but it preferred to use a rayon grade wood pulp.

Any suitable amine oxide which is a solvent for cellulose and is compatible with water and, if an organic liquid non-solvent is used, is also compatible with the organic liquid may be used such as, for example, those disclosed in the aforesaid patents. However, the preferred amine oxides are cyclic mono-(N-methyl-amine-N-oxide) compounds such as, for example, N-methylmorpholine-N-oxide, N-methylpiperidine-N-oxide, N-methylpyrollidone-oxide, dimethylcyclohexylamine oxide, and the like.

Any suitable aprotic organic liquid non-solvent for cellulose which will not react chemically with the amine oxide or cellulose may be used such as, for example, an alcohol such as methyl alcohol, n-propyl alcohol, isopropyl alcohol, butanol and the like, toluene, xylene, dimethylsulfoxide, dimethylformamide, dimethyl acetamide or the like.

In the following examples all parts and percentages are by weight unless otherwise stated.

EXAMPLE I

About 40 grams of dry rayon grade wood pulp containing about 5.6% water is soaked for about 60 minutes in N-methylmorpholine oxide containing about 10% water. The wood pulp absorbs amine oxide and water with swelling of the fibers. The wood pulp is removed from the supernatant liquid and cooled at room temperature for about 30 minutes. The resulting product is a hard, breakable, hygroscopic cellulose product containing about 26.9% cellulose, about 67.4% N-methylmorpholine and about 5.2% water.

EXAMPLE II

About 200 grams dry wood pulp sheet is soaked in an excess of N-methylmorpholine oxide containing about 12.4% water at about 85°–90° C. for about 15 minutes. The cellulose absorbs liquid and swells. The cellulose-amine-oxide product after cooling to room temperature is a hard, crystalline material containing about 23.8% cellulose, about 64.4% N-methylmorpholine and about 11.8% water.

EXAMPLE III

One sheet of wood pulp weighing about 40 grams containing 5.81% water is soaked in an excess of N-methylmorpholine oxide containing about 13.1% water at about 85° C. for 5 minutes. The cellulose absorbs liquid and swells becoming transparent. The mixture is cooled for about 30 minutes to room temperature. The product is a hard crystalline material which can be broken or ground. It contains about 73.5% of the amine oxide, about 12.5% water and about 13.5% cellulose.

EXAMPLE IV

About 320 grams wood pulp is soaked in about 1053 grams N-methylmorpholine oxide containing about 13.9% for about 5 to 8 minutes at 78° C. to 80° C. until the liquid is absorbed. The sheet is cooled and maintained at 25° C. The product is a hard crystalline material after 24 hours.

EXAMPLE V

About 2083 grams of N-methylmorpholine-oxide containing 37.1% water are mixed in a round bottom flask or rotatable evaporator with about 583 milliliters of toluene with stirring or rotation of the evaporator. The mixture is heated to 80° C. and about 500 grams of dry rayon grade wood pulp are mixed therewith and the suspension is stirred about 10 minutes at atmospheric pressure. The wood pulp absorbs amine oxide-water-toluene solution with swelling. The temperature is reduced to about 60° C. and the contents of the vessel is placed under vacuum (about 27 inches mercury) to strip the toluene and water from the vessel until substantially all of the toluene has been removed and the water content of the cellulose-amine oxide product is about 28.7%. The product is a soft particulate cellulose containing absorbed amine oxide-water mixture.

EXAMPLE VI

About 955 grams of N-methylmorpholine-oxide containing about 37.2% water are mixed in an evaporator with about 600 milliliters of methyl alcohol with stirring and heating to about 60° C. About 200 grams dry wood pulp are added to the mixture and the evaporator is rotated at about 40 r.p.m. for about 10 minutes. The cellulose absorbs liquid and swells. Liquid phase is removed under vacuum until all of the methanol is recovered. The cellulose-amine-oxide product then contains about 13% water.

EXAMPLE VII

About 332 grams of N-methylmorpholine-oxide containing about 26.58% water is heated to about 85° C. and placed in a suitable flask. About 400 milliliters toluene and about 200 grams bone dry wood pulp are mixed with the amine oxide and stirred for about 10 minutes. The cellulose absorbs liquid and swells. The mixture is cooled to about 80° C. and the flask is evacuated until all of the toluene is removed. The water content of the cellulose-amine oxide after the toluene is removed is about 16.45%.

About 400 milliliters of toluene are added to the contents of the flask at 80° C. and evaporation under vacuum is repeated until the toluene is removed. The water content of the cellulose-amine oxide product is then about 13.0%.

EXAMPLE VIII

About 1600 grams of N-methylmorpholine oxide containing 25% water and about 400 milliliters of toluene are mixed and heated to a temperature of about 80° C. in an evaporator. About 400 grams bone dry wood pulp are added and the evaporator is rotated for about 10 minutes at about 40 r.p.m. A vacuum is applied to the product in a flask to reduce the pressure to about 26.5 inches of Hg for about 25 minutes with removal of the toluene. The mean water content of the amine-oxide saturated cellulose is about 13.7%.

EXAMPLE IX

About 952 grams of N-methylmorpholine-oxide containing 37% water are mixed with about 200 milliliters isopropyl alcohol (IPA) and the mixture is heated to 80° C. in a rotary evaporator. About 200 grams of wood pulp dried to a moisture content of about 6% are added to the amine oxide-water-IPA solution and the mixture is heated to about 80° C. for about 10 minutes while the evaporator is rotating. An additional 400 milliliters of IPA are added to the contents of the evaporator at 80° C. and a vacuum is applied to reduce the pressure to 27 inches Hg until the IPA is removed and no more water is being removed. The cellulose containing amine oxide-water is placed in a vacuum oven at 50° C. and at 27 inches Hg for 4 days. Upon cooling after removal from the oven, the cellulosic product hardens and is cut into chips of about 3 cubic millimeters.

EXAMPLE X

The procedure of Example IX is repeated except that about 800 grams of N-methylmorpholine oxide containing about 25% water, about 200 grams wood pulp and two 400 millimeter volumes of isopropyl alcohol are used.

EXAMPLE XI

About 1070 grams of N-methylmorpholine-oxide containing about 25.27% water are mixed with about 200 milliliters of isopropyl alcohol and heated to 80° C. About 200 grams wood pulp are added to the resulting mixture and the resulting suspension is steeped until the wood pulp swells. About 400 milliliters of isopropyl alcohol are added and after 10 minutes the isopropyl alcohol and water are removed under facuum at 55° C. and 27 inches Hg.

EXAMPLE XII

About 2175 grams of a solution which is about 49.4% N-methylmorpholine-oxide, about 42.45% methyl alcohol and about 9.15% water (about 14.16% water based on the weight of the amine oxide and water in the solution) is placed in an evaporator flask and heated to about 80° C. About 300 grams wood pulp chips having an average particle dimension of about 1 sq. centimeter are added to the solution. Liquid is removed under vacuum from the mixture until all of the methyl alcohol has been removed. At this point the water content is about 12.7% by weight and the cellulose has swollen.

After seven days' storage of the product in a vacuum over at 50° C. the product is about 19.5% by weight cellulose and about 14.7% water. After three additional days' storage at ambient temperature, the product had become hard and crystalline.

EXAMPLE XIII

About 587 g. of dimethylethanol amine oxide-water mixture containing about 14.86% by weight water is placed in a 22 liter flask. About 41 g. water and about 500 ml (395 g.) methanol are added to the flask and the contents of the flask are heated to about 80° C. The liquid in the flask is composed of about 500 g dimethylethanolamine oxide, about 128.5 g. water, and about 395 g. methanol. About 97.6 g. of V 68 wood pulp sheet is cut into about 3/16 inch squares and added to the flask. The ratio in the flask is about 5 parts by weight water and methanol mixture per part of cellulose.

The slurry is rotated in a rotary evaporator for about 15 minutes during which time the cellulose fibers become swollen. A vacuum is applied to the flask to reduce the pressure to about 27 inches of mercury and the slurry is cooled to about 65° C. One hour later, the methanol is removed by distillation to produce cellulose chips impregnated with amine oxide. The chips contain about 16% by weight water and are dried at about 65° C. under vacuum at 28 inches mercury absolute for 68 hours. The chips are cooled to room temperature and are a hard cellulose chip product containing about 10% by weight water.

EXAMPLE XIV 67.5 g. cellulose pulp are added in a flask containing 383.46 g. Dimethylcyclohexyl-amine-oxide monohydrate, 116.82 g. water and 49.7 g. metanaol. The contents of the flask are heated to about 60° C. for 10 minutes during which time the cellulose fibers absorb the liquid solution and become swollen. A vacuum is then applied to the flask, at about a 23-25 inches of mercury, for about 60 minutes at 80° C. to remove a large part of the methanol.

The impregnated cellulose then is dried in a vacuum over at 60° C. for 80 hours under an about 25" vacuum, to remove any remaining methanol and excess water to produce a solid, dry cellulose product impregnated with the amine oxide.

The dried chips are cooled to room temperature and are observed to be a hard cellulose chips product containing, theoretically 7.7% water and 2.9% methanol. A hundred gram sample of the dried chips is added to a mixer at 90°–95° C. for 70 minutes to completely mix and dissolve the cellulose in amine-oxide ready for extrusion into film, filament or fibers of cellulose.

In each of the foregoing examples, the cellulose absorbs the amine oxide without dissolving.

The amine oxide used in practicing the invention may be prepared by oxidizing the amine as described in U.S. Pat. Nos. 3,333,000, 3,447,939 or other suitable process. For convenience the amine oxide has been referred to herein as simply "amine oxide" but it is to be understood that the amine oxide is always a tertiary amine oxide.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for making a precursor of a solution containing cellulose dissolved in a tertiary amine oxide solvent for cellulose which comprises impregnating cellulose with a liquid tertiary amine oxide solvent containing water in an amount whereby the cellulose does not dissolve in the solvent under the conditions of impregnation but the cellulose becomes impregnated with the solvent in an amount which will dissolve the cellulose after water is removed and the impregnated cellulose is heated in the absence of additional solvent.

2. The process of claim 1 wherein the said product is comminuted to form cellulose chips adapted to be fed to an extruder.

3. The process of claim 1 wherein the amine oxide is N-methylmorpholine oxide.

4. The process of claim 1 wherein the product contains from about 50% to about 90% by weight tertiary amine oxide, from 0 to 20 percent by weight water and from about 10% to about 40% by weight cellulose.

5. The process of claim 1 wherein the cellulose is suspended in the mixture at a temperature of from about 85° C. to about 110° C.

6. A process for making a precursor of a solution of cellulose in a tertiary amine oxide which comprises suspending cellulose in a mixture containing a tertiary amine oxide, water and an organic liquid which is nonreactive chemically but is miscible with the tertiary amine oxide and water and is a nonsolvent for cellulose until liquid is absorbed by the cellulose, said mixture being a nonsolvent for the cellulose at the temperature at which the cellulose is suspended therein, and thereafter removing the nonsolvent to provide a solid cellulose product containing absorbed tertiary amine oxide and water which upon heating becomes a solution of cellulose.

7. The process of claim 6 wherein the said non-solvent and water are removed until the product consists of cellulose and absorbed tertiary amine oxide containing water.

8. The process of claim 7 wherein the said product is comminuted to form cellulose chips adapted to be fed to an extruder.

9. The process of claim 6 wherein the tertiary amine oxide is N-methylmorpholine oxide.

10. The process of claim 6 wherein the product contains from about 50% to about 90% by weight tertiary amine oxide, from 0 to 20 percent by weight water and from about 10% to about 40% by weight cellulose.

11. The process of claim 6 wherein the non-solvent and water are removed until the cellulose tertiary amine oxide product contains from about 0 to about 20 percent weight water.

12. The process of claim 6 wherein the cellulose is suspended in the mixture at a temperature of from about 50° C. to about 140° C. and the non-solvent is removed under vacuum at a temperature of from about 40° C. to about 90° C.

13. The process of claim 6 wherein the ratio of said mixture to cellulose when mixed with the cellulose is from about 0.25 to about 2.5 parts by weight mixture per part by weight cellulose and the ratio of tertiary amine oxide and water to the cellulose is from about 1.5 to about 9 parts tertiary amine oxide and water per part by weight cellulose after the said non-solvent is removed.

14. In a process for shaping a solution containing cellulose dissolved in a solvent containing a tertiary amine oxide and water and precipitating the cellulose to form a shaped solid cellulose article, the improvement which comprises impregnating cellulose with a liquid mixture which contains a tertiary amine oxide and water which mixture is a nonsolvent for cellulose under the conditions of the impregnation but the solvent is absorbed by the cellulose, retaining the cellulose and absorbed solvent without the cellulose dissolving until a solution is to be prepared, removing water from the said nonsolvent to convert it into a solvent for cellulose and heating the cellulose with absorbed solvent until the cellulose dissolves in the solvent, shaping the solution, and precipitating the cellulose from the shaped solution.

15. A solid precursor of a solution of cellulose in a tertiary amine oxide comprising cellulose and absorbed tertiary amine oxide.

16. The product of claim 15 containing 10 to 40% by weight solid cellulose and about 50% to about 90% by weight of tertiary amine oxide and water.

17. A process for making a precursor of a solution containing cellulose dissolved in a tertiary amine oxide which comprises
mixing cellulose with a liquid mixture containing a tertiary amine N-oxide solvent for cellulose and water which mixture is a nonsolvent for cellulose, maintaining the resulting mixture until the cellulose absorbs said nonsolvent in an amount to provide sufficient tertiary amine oxide to dissolve the cellulose after water is removed to convert the said nonsolvent into a solvent for the cellulose.

18. In a process for making a cellulose fiber wherein a solution of cellulose in a solvent therefor is spun to form a filament and the cellulose in the filament is separated from the solvent to form a cellulose fiber, the improvement which comprises preparing a solid cellulose product which can be converted alone into a spinnable cellulose solution, said improvement comprising the step of (1) suspending cellulose in a tertiary amine oxide and water at a temperature at which the cellulose will not dissolve in the amine oxide, (2) maintaining the suspension until amine oxide and water are absorbed by the cellulose in an amount capable of dissolving the cellulose at a temperature above the temperature of the suspension and (3) separating the cellulose having the amine oxide absorbed therein from unabsorbed amine oxide and water to provide a solid cellulose product which can be heated without the addition of solvent to form a spinnable solution.

19. A comminuted cellulose product adapted to be converted into a solution containing cellulose dissolved in a tertiary amine oxide and water, said product comprising cellulose impregnated with a solvent containing a tertiary amine oxide and water in an amount which will dissolve the cellulose when the product is heated to form a spinnable or extrudable solution without additional solvent for the cellulose.

* * * * *